Feb. 24, 1959        PAUL NARBUTOVSKIH NOW BY        2,875,263
                     CHANGE OF NAME PAUL NARBUT
Filed Aug. 28, 1953  TRANSFORMER CONTROL APPARATUS
                                                    2 Sheets-Sheet 1

WITNESSES
Robert C. Baird
K. W. Thomas

INVENTOR
Paul Narbutovskih.
BY
Ezra W. Savage
ATTORNEY

Feb. 24, 1959  PAUL NARBUTOVSKIH NOW BY  2,875,263
CHANGE OF NAME PAUL NARBUT
Filed Aug. 28, 1953  TRANSFORMER CONTROL APPARATUS
2 Sheets-Sheet 2

WITNESSES:

INVENTOR
Paul Narbutovskih.
BY
ATTORNEY

United States Patent Office 2,875,263
Patented Feb. 24, 1959

2,875,263

TRANSFORMER CONTROL APPARATUS

Paul Narbutovskih, Sharpsville, Pa., now by change of name Paul Narbut, assignor to Westinghouse Electric Corporation, East Pittsburgh, Pa., a corporation of Pennsylvania Application August 28, 1953, Serial No. 377,050

7 Claims. (Cl. 174—15)

This invention relates to electrical apparatus and particularly to apparatus utilizing a fluid dielectric atmosphere for insulation and a cooling mechanism for dissipating heat developed during operation of the apparatus.

This application is a continuation-in-part of application Serial No. 168,008, now abandoned, filed June 14, 1950, by Paul Narbutovskih, and assigned to the same assignee as this invention.

It is well known in the electrical industry to insulate enclosed electrical apparatus with a liquid dielectric by immersing operating electrical elements therein for the conjoint purpose of cooling the electrical elements and electrically insulating the elements from one another and from the casing in which they are disposed. However, disadvantages have been found to occur in the manufacture and use of liquid dielectric insulated apparatus of this type. One disadvantage is the necessity for employing large quantities of liquid dielectric, such as oil or a chlorinated diphenyl, or the like.

Liquid dielectrics require attention and maintenace since they may sludge or deteriorate by reaction with any moisture and oxygen or other reactive gas that may enter the electrical apparatus and thereby suffer a degradation of their insulating characteristics. If an electric arc develops within a liquid dielectric-filled apparatus, it may either cause an explosion or fire when mineral oil is the liquid dielectric or else develop corrosive and harmful halogen fumes when a chlorinated dielectric liquid is present that at least corrode the interior of the apparatus. Other disadvantages are known to those working in the art.

The recently developed dry-type, gas-filled or air-cooled transformer avoids some of the disadvantages of the liquid dielectric-filled equipment but has a number of disadvantages of its own. One disadvantage is the necessity for providing adequate means in the windings for penetration and flow of air or other gas to secure sufficient cooling of the electrical apparatus. Thus, solid insulating barriers between the windings and ground are not practicable, because of the necessity for air ducts behind the windings and in the absence of such solid insulating barriers, the flashover or breakdown voltage between the windings and ground limits the potentials that can be employed. The core and coil in a gas-filled transformer are larger for a given rating than in a liquid-cooled transformer. In practice, the air-filled transformer has very little overload capacity, and this limits its ability to operate above its rated capacity and affects its dependability as contrasted to the liquid dielectric-filled apparatus.

In the Hill Patent 2,561,738, which matured from application Serial No. 125,459, filed November 4, 1949, and assigned to the same assignee as this invention, there is disclosed an enclosed electrical apparatus utilizing a relatively small amount of liquid fluorocarbon which is sprayed in a thin layer over the electrical windings to cool them by evaporation of the fluorocarbon, the fluorocarbon vapors constituting at least a part of the applied electrically insulating gas atmosphere. Such apparatus is efficient in operation but has the disadvantage that the vapor pressure developed within the casing varies greatly.

An object of this invention is to provide, in an enclosed electrical apparatus depending on fire and explosion-proof gases for its insulation and relying on a mixture of non-condensable and condensable gases to dissipate the heat developed in use, for controlling the cooling of the gases and the proportion or ratio of the gases in the casing in response to atmospheric conditions within the casing.

Another object of this invention is to provide an enclosed electrical apparatus with a non-condensable gas and a vaporizable liquid coolant which is sprayed thereover and mixes with the non-condensable gas and to control the proportion of the vapor-gas mixture in accordance with atmospheric conditions within the casing to maintain a predetermined minimum concentration of the vapor within the casing to provide a minimum vapor pressure and vapor-gas dielectric strength within the casing and a minimum operating temperature of the apparatus.

Other objects of this invention will become apparent from the following description when taken in conjunction with the accompanying drawings, in which.

Figure 1:
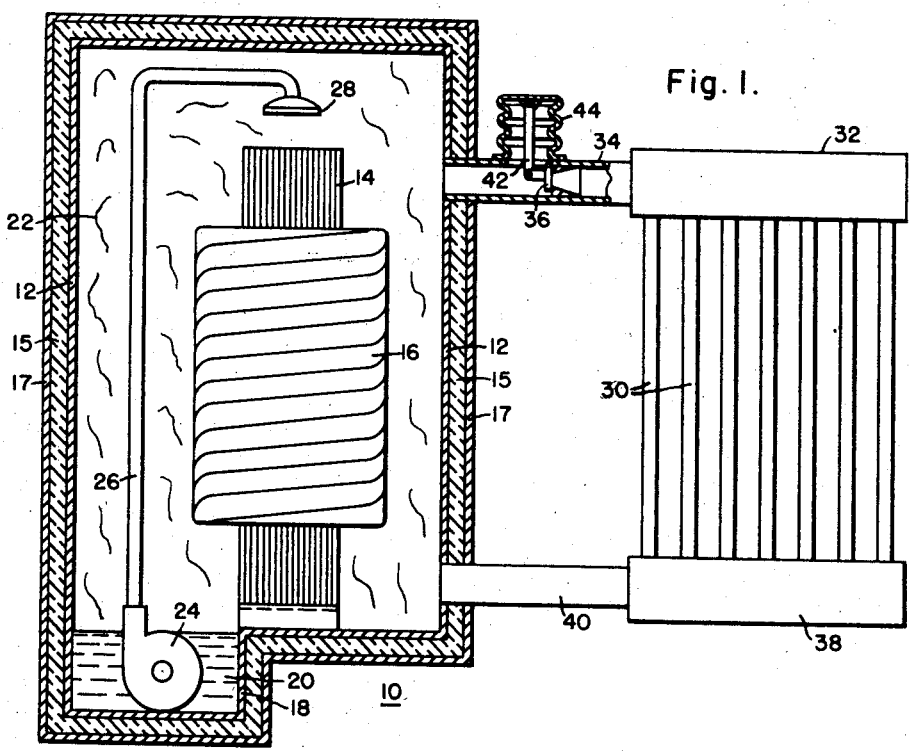
Figure 1 is a diagrammatic view of a transformer constructed in accordance with this invention.

Referring to Fig. 1, this invention is illustrated by reference to a transformer 10 comprising a sealed casing 12 within which is disposed a magnetic core 14 and electrical windings 16 associated therewith disposed to seat on the base of the casing. For the purpose of simplifying the drawing, leads to the winding 16 and the bushings normally carried by the top or cover of the casing 12 are not shown. As will be explained more fully hereinafter, a layer 15 of heat insulating material, such as glass fiber or the like, is applied about the casing 12, being maintained in position by an outer jacket 17 of metal.

As illustrated, the bottom of the casing 12 is provided with a sump 18 in which there is disposed a supply 20 of vaporizable liquid coolant. The supply 20 of the liquid coolant is relatively small as compared to the size of the casing 12 being normally only in the sump 18 out of contact with the core 14 and the electrical windings 16.

The space within the casing 12 surrounding the magnetic core 14 and the windings 16 comprises in part a gas 22 which is preferably a permanent or non-condensable, that is, non-condensable during conditions of use of the transformer, gas, such as nitrogen, argon, neon, carbon dioxide, or the like, or mixtures thereof. Under certain conditions, air may be used as the non-condensable constituent of the gas space. These gases are moderately good insulating gases at atmospheric pressure and have properties suitable for providing electric insulation at moderate voltages when used alone. However, the insulating properties of the non-condensable gas will be greatly enhanced by the pressure of the saturated vapor of the liquid coolant. The dielectric strength of the vapor-gas mixture depends greatly upon the proportion of the coolant vapor, which, in turn, depends upon temperature of the vapor-gas space in the casing 12. It is then apparent that in order to maintain a specified minimum dielectric strength of the gas-vapor mixture, it is necessary to maintain a certain minimum temperature within the casing 12.

Different vaporizable liquid coolants are known to those skilled in the art and can be employed in practicing this invention. As an example of a suitable vaporizable liquid coolant, reference may be had to the perhalocarbons in which the halogen atoms are composed of at least 50 mole percent of fluorine and the balance chlorine, and a boiling point within the range of 50° C. to 225° C. The choice of the vaporizable liquid coolant will, of course, depend somewhat on the temperature which the insulation of the electrical windings 16 may withstand without deterioration and may include perhalocarbons which have boiling points of 195° C. and higher. As examples of perhalocarbons, reference may be made to monochloropentadecafluorodimethylcyclohexane ($C_8F_{15}Cl$) or (trifluoromethyl) monochlorotetrafluorobenzene, the latter having a boiling point of 137° C. and a freezing point of −88° C., and to perfluorofluorane having a boiling point of 190° C. and a freezing point of −60° C.

Other vaporizable liquid coolants falling within this classification which may be utilized are those disclosed in the Hill Patent 2,561,738 and comprising the liquid fluorinated organic compounds that boil in the range of 50° C. to 225° C. at atmospheric pressure. Examples of suitable fluorinated compounds identified in the aforesaid Hill patent are perfluoromethylcyclohexane, perfluorodimethylcyclohexane, perfluoroheptane, perfluorohexane, perfluorotoluene, perfluoropropylcyclohexane, perfluoroethylcyclohexane and perfluorodiethylcyclohexane. The freezing point of these liquid fluorocarbons is considerably below zero degrees centigrade so that they can be safely employed under nearly all ambient conditions expected to be encountered in service.

Other perhalocarbons especially suitable for the purpose of this invention are perfluoro-1-methyl-naphthalene having a boiling point of 161° C. and a freezing point below −75° C., perfluoro-2-methylnaphthalene having a boiling point of 161° C. and a freezing point of below −60° C., perfluoroethylcyclohexane having a boiling point of 101° C. and a freezing point of −90° C., perfluoro-m-diethylcyclohexane having a boiling point of 145° C. and a freezing point of −76° C., perfluoropropylcyclohexane having a boiling point of 125° C. and a freezing point of −56° C., and (trifluoromethyl) pentafluorobenzene having a boiling point of 105° C. and a freezing point of −86° C. It will, of course, be understood that mixtures of the aforementioned fluorinated organic liquid coolants can be employed as the liquid coolant 20.

In order to apply the liquid coolant 20 to the electrical windings 16, a pump 24 is disposed for operation to withdraw the liquid coolant 20 from the sump 18, the pump 24 being connected as by a conduit 26 to a suitable spray device 28 from which the liquid coolant is distributed in the form of a spray (not shown) over the core 14 and the windings 16. Other methods of applying the liquid to the core and the windings may be used, consistent with the physical arrangement of the apparatus, the only essential requirement being a reasonably uniform distribution of the liquid film over the parts to be cooled. The liquid coolant when thus delivered distributes itself as a thin film (not shown) over the electrical elements within the casing 12 and is caused to evaporate freely after the electrical components are hot, thereby cooling the core 14 and the electrical windings 16. As the liquid coolant thus vaporizes, the vapors thereof mix with the non-condensable gas present in the casing to increase the dielectric strength of the insulating gas within the casing 12. The advantages of the mixture of the non-condensable gas and the vapors of the liquid coolant are clearly disclosed in the copending application Serial No. 102,248 of L. J. Berberich et al., filed June 30, 1949, and assigned to the assignee of this invention.

Since the casing 12 is preferably heat insulated by the layer 15, in order to dissipate the heat from the vapor-gas mixture within the casing 12 under certain predetermined conditions which will be explained more fully hereinafter, a cooling device, such as a radiator 30, is disposed to be connected to the casing 12. For this purpose, the upper header 32 of the radiator 30 is connected through a conduit 34 and a valve mechanism 36 to the upper end of the casing 12, and the lower header 38 is connected through a conduit 40 to the lower end of the casing 12.

In order to control the operation of the valve 36, the valve is connected by a pivoted link 42 to the end of a sylphon bellows 44, one end of which is open to the conduit 34 on the casing side of the valve 36, whereby the bellows 44 is actuated in response to the vapor pressure within the casing 12.

In practice, after the transformer has been assembled and all of the joints are sealed so that the casing 12 is relatively gas tight, if it is not intended to use air as the non-condensable gas, then the air present within the casing and radiator assembly is withdrawn in any one of a number of conventional ways and replaced by an inert, non-condensable, insulating gas, such as nitrogen. Thereafter, a required quantity of the liquid coolant is introduced into the sump 18 of the transformer. The amount of the liquid coolant required should be sufficient to fill the casing 12 and the radiator 30 associated therewith with the saturated vapor of the coolant at the maximum temperature of the gas-vapor mixture expected during the operation of the apparatus, with a sufficient surplus left in the liquid form to supply the pump and distribution system for the liquid coolant.

In operation, as the windings 16 become heated and the liquid fluorocarbon is sprayed thereover, the vapors evolved by reason of the heat of the apparatus become mixed with the non-condensable gas and increase the dielectric strength of the gaseous atmosphere in the casing 12. As will be understood, as the temperature of the windings 16 increases, as by reason of an increase in the load, the temperature and hence the pressure of the vapor-gas mixture or dielectric medium within the casing increase. Assuming that the valve 36 were not present in the conduit 34, the resulting mixture of vapor and non-condensable gas will enter into the bottom header 38 of the radiator 30 and flow upwardly through the radiator. This manner of flow will exist whenever the molecular weight and, hence, the density of the vapor of the liquid coolant is appreciably greater than the density of the non-condensable constituent of the gas space. In the radiator 30, heat is extracted from the mixture, causing condensation of the condensable vapor, which in the liquid form flows through the lower conduit 40 to the sump 18 in the casing 12. The cooled non-condensable gas is returned to the casing 12 through the upper conduit 34. Thus, it is apparent that when the valve 36 is not present the radiator 30 dissipates the heat generated in the normal operation of the transformer 10 with equal effectiveness regardless of the magnitude of the load. The result of this is that the temperature, pressure, and the dielectric strength of the coolant vapor will vary over a wide range during the normal operation of the transformer 10, as a consequence of the variation in load and in the ambient temperature. If a reasonably high pressure, temperature and the dielectric strength of the gas-vapor space is permitted at the highest load and the highest ambient temperature, the dielectric strength at the lowest load and lowest ambient temperature will be undesirably low.

However, with the valve 36 present in the conduit 34, the vapor-pressure of the gas-vapor mixture in the casing 12 is controlled to prevent such wide variations in the vapor-pressure and the operating temperature of the transformer and to maintain a minimum operating temperature and consequently minimum dielectric strength of the vapor-gas mixture. Thus, assuming that the transformer 10 is operating at maximum allowable load with the result that the liquid coolant is sprayed and vaporizes at the maximum rate whereby it mixes with the non-condensable gas to produce a maximum vapor pressure, the pressure within the sealed casing 12 actuates the sylphon bellows 44 to operate the valve 36 to its open position to permit a free circulation of the vapor-gas mixture through the cooling radiator 30 as described hereinbefore whereby the full heat dissipating capacity of the radiator 30 is utilized, the condensed liquid coolant being returned from the radiator 30 to the sump 18 and the cooled non-condensable gas is admitted to the casing 12. The cooled atmosphere may contain some vapors of the liquid coolant depending upon the heat dissipating ability of the radiator, and the rate of vapor-gas circulation therethrough. Now as the load on the transformer 10 is decreased to its minimum value within the working range, the pressure on the bellows 44 is decreased and the valve 36 is gradually closed until at such minimum value of load, the valve 36 is in the closed position to prevent circulation of the dielectric gaseous mixture through the radiator 30.

With the valve 36 thus closed, the vapor-gas mixture admitted to the radiator 30 is cooled therein with the result that the condensed liquid coolant is returned to the sump 18 but the non-condensable gas is retained in the radiator 30 which, under such operating conditions, functions as a storage reservoir for the non-condensable gas therein. By preventing the return circulation of the entrapped gas in this manner, it is seen that such cooled gas will not affect the temperature of the vapor-gas mixture within the casing 12. As the liquid coolant is continuously applied to the windings 16, the vapor evolved and mixed with the remaining non-condensable gas within the casing 12 produces a higher concentration of the vapor in the casing 12 when the valve 36 is closed.

Thus, as the non-condensable gas accumulates in the radiator 30, it effectively blocks the circulation of the condensable gas to the radiator, whereby even at no-load operating conditions, a high dielectric strength of the vapor atmosphere in the casing 12 results. The layer 15 of insulation about the casing 12 cooperates to prevent loss of heat through the casing 12 whereby the vapor pressure and dielectric strength are maintained within the casing. Under such conditions of no-load operation or when the load is at its minimum value and the valve 36 is closed, an increased concentration of the vapor tends to compensate for the decrease in the vapor pressure and temperature, in maintaining an approximately constant dielectric strength of the vapor atmosphere.

In this specification the condition of the gas-vapor mixture or dielectric medium within the casing 12 shall be treated as either the temperature or pressure of the dielectric medium within the casing 12, or both. Thus, instead of controlling the operation of the valve 36 in response to the pressure within the casing 12, the valve 36 may be actuated in response to the temperature within the casing 12, for as will be understood, the pressure and temperature within the casing 12 are dependent one upon the other. In the embodiment illustrated in Fig. 2, the valve 36 is disposed to be actuated by a solenoid 46, the energizing winding 48 of which are connected in circuit relation with a tapped resistor 50, the connections to which are disposed to be adjusted by means of a movable contact member 52 actuated by a suitable thermal responsive device, such as the bimetal element 54.

The bimetal element 54 is disposed within the casing 12 and is so selected that for a minimum operating load and consequently a predetermined minimum temperature within the casing 12, the bimetal element 54 is in a position to maintain the movable contact member 52 in a circuit opening position, and the energizing winding 48 of the solenoid 46 is deenergized whereby the valve 36 is in its closed position. As the operating load and consequently the temperature within the casing 12 increase, the bimetal element 54 is flexed to actuate the movable contact member 52 to connect the winding 48 of the solenoid to be energized and to progressively increase the energization of the solenoid. As the solenoid 46 is energized, it actuates the valve 36 towards its open position to permit the radiator 30 to effectively cool the vapor-gas mixture admitted thereto and to control the operating temperature, vapor pressure and vapor-gas dielectric strength in the same manner as described hereinbefore with respect to the embodiment of Fig. 1.

Figure 2:
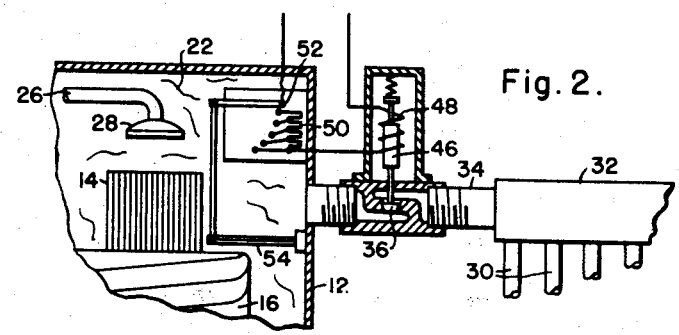
Fig. 2 is a fragmentary diagrammatic view illustrating another embodiment of this invention.
Figure 3:
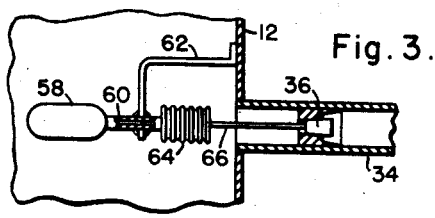
Fig. 3 is a fragmentary diagrammatic view illustrating a further embodiment of this invention.

Instead of the embodiment of Fig. 2 in which an electrical control is operated in response to temperature, a simplified temperature responsive control such as is illustrated in Fig. 3 may be employed. In this embodiment, a bulb 58 is disposed within the casing and is filled with one of the well-known vaporizable liquids (not shown). The bulb 58 is connected as by a tube 60, which is secured in position as by a bracket 62 carried by the casing 12, to a sylphon bellows 64. The sylphon bellows 64 is connected by the rod 66 to the valve 36. As the temperature within the casing 12 increases, the liquid within the bulb 58 vaporizes to apply pressure internally of the bellows 64 to actuate the valve 36 towards its open position.

Figure 4:
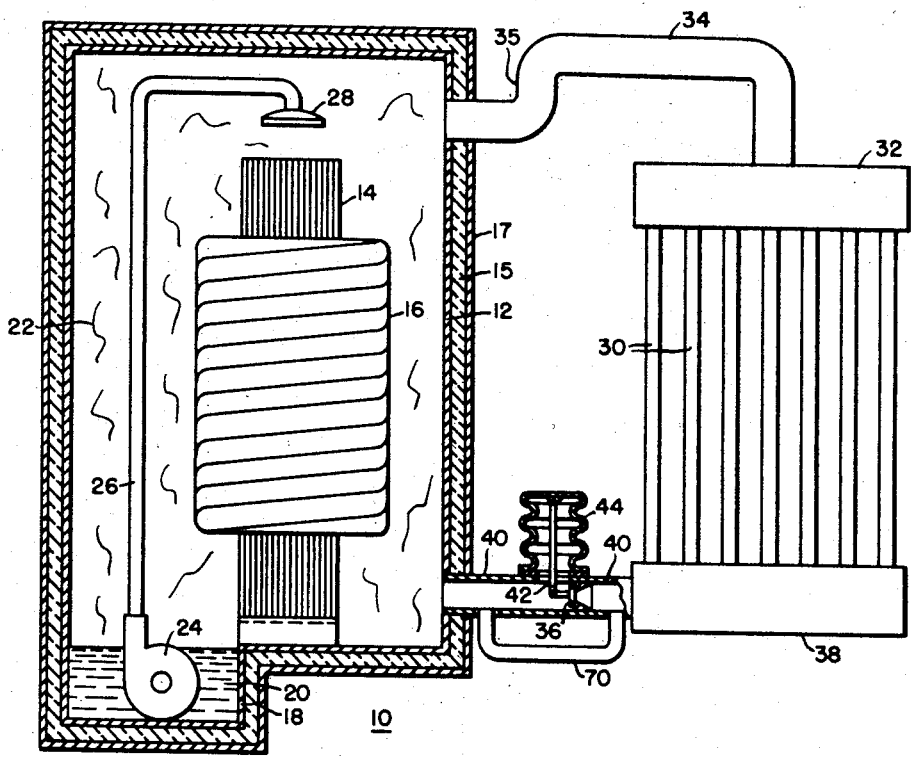
Fig. 4 is a diagrammatic view illustrating a still further embodiment of this invention.

Referring to Fig. 4 there is illustrated another embodiment of this invention in which like components of Figs. 1 and 4 have been given the same reference characters. The main distinction between the apparatus illustrated in Figs. 1 and 4 is that in the apparatus illustrated in Fig. 4 the valve 36, the sylphon bellows 44 and the link 42, illustrated in Fig. 1, are associated with the lower conduit 40 instead of with the upper conduit 34. Further, it has been found that with the valve 36 associated with the lower conduit 40, the upper conduit 34 should communicate with the interior of the casing 12, preferably, through an inverted portion 35, of the conduit 34. Although not essential to the functioning of the embodiment shown on Fig. 4, the presence of this inverted portion 35 of the conduit 34 is helpful in reducing any flow of the hot and heavy condensable vapors from the casing 12 to the radiator 30, through the upper conduit 34, when the valve 36 is closed.

In order to permit the drainage of the condensate from the cooling device 30 to the sump 18 and yet prevent the passage of the gas-vapor mixture through the lower conduit 40 to the cooling device 30 when the valve 36 is in the closed position, a liquid trap 70 is provided. As illustrated, the liquid trap 70 is connected in communication with the lower conduit 40 on both sides of the valve 36.

The operation of the apparatus illustrated in Fig. 4 is similar to the operation of the apparatus illustrated in Fig. 1. In the apparatus illustrated in Fig. 4, at low loads on the transformer 10 and in which the valve 36 is in the closed position, non-condensable gas and some condensable vapors are transferred through the upper conduit 34 to the cooling device 30. The condensable vapors condense within the cooling device 30 and flow through the liquid trap 70 to the sump 18. However, with the valve 36 in the closed position, the non-condensable gas becomes entrapped within the cooling device 30. Thus, as the non-condensable gas accumulates in the cooling device 30, it effectively blocks the circulation of the condensable vapors to the cooling device 30, whereby even at no-load operating conditions, a high dielectric strength of the vapor atmosphere in the casing 12 results.

As the temperature and pressure of the condensable vapors within the casing 12 increases, the sylphon bellows 44 effects an actuation of the valve 36 towards the fully open position. As the temperature and pressure of the condensable vapors within the casing 12 increases further, the valve 36 is actuated further towards its fully open position. With the valve 36 in the open position, a mixture of condensable vapors and non-condensable gas flows through the lower conduit 40 into the cooling device 30. Once the condensable vapors enter the cooling device 30 through the lower conduit 40, the vapors are condensed and the condensate flows through the liquid trap 70 back to the sump 18. Any of the condensable vapors that enter the cooling device 30, through the lower conduit 40, and that are not condensed, are returned along with the non-condensable gas within the cooling device 30 to the casing 12 through the upper conduit 34. Thus, by providing the control apparatus illustrated in Fig. 4 the temperature and pressure of the condensable vapors within the casing 12 are maintained within given limits so as to provide a relatively high dielectric strength for the dielectric medium within the casing 12 when the transformer 10 is at relatively low loads.

In the embodiments described, it will be understood that the effectiveness of the apparatus will depend on the relative amount of heat dissipated by the radiator system and by the casing 12 alone when the transformer is operating at maximum load. Thus, the radiator system employed should preferably have considerably larger heat dissipating capacity than that of the casing alone because where the radiator system has a greater amount of heat dissipating ability, it is found that the apparatus is more effective in maintaining a near constant pressure, temperature and dielectric strength of the vapor-gas mixture within the casing for a greater range in the load variation. For this reason, the casing 12 should preferably be insulated as described in the embodiment of Fig. 1.

Where the fluorinated organic compounds are utilized as the liquid coolant 20 in the apparatus described, it is found that such compounds evolve vapors which have outstanding electrical insulating properties and which cooperate with the non-condensable gas in the casing to give outstanding dielectric strength. The vapors of the fluorinated organic compounds are superior to practically all other gases in such electrical insulating characteristics, as dielectric strength, power factor and resistance to the formation of corona. Such perhalocarbons are outstanding in their stability in chemical and thermal breakdown being surpassed only by the permanent gases. They exert negligible, if any, solvent deteriorating action on ordinary materials and varnishes employed in the preparation of conventional electrical elements such as windings and coils. The selection of the particular fluorinated organic compound employed will, of course, depend somewhat on the insulating materials and varnishes employed in constructing the electrical device within the casing 12 so as to cooperate with the non-condensable gas to maintain a temperature within the electrical device at which the insulating material will not be damaged. With the apparatus described and employing the vapor-gas mixture and the cooling control disclosed, it is found possible to increase the kv.-a. rating of the electrical device over known liquid dielectric-filled transformers and air-cooled transformers.

While this invention has been described with particular reference to transformers, it will be understood that the invention may be applied to other types of sealed electrical apparatus such as, for example, switchgear, capacitors, generators, reactors and the like. The spraying of the liquid coolant to the electrical device to effect the mixture of the vapor-gas may be accomplished in a number of different ways to effectively obtain a good mixture to efficiently extract or dissipate the heat from, and to insulate, the electrical apparatus. In all cases, an excellent heat transfer and control of the pressure, temperature and dielectric strength of the vapor-gas mixture is obtained with a minimum of apparatus.

I claim as my invention:

1. In an electrical apparatus, in combination, a sealed casing having an electrical conductor disposed therein which is subject to temperature changes when in use, a non-condensable gas and a vaporizable liquid coolant contained by the casing, the liquid coolant comprising a fluorinated organic liquid coolant which will vaporize at temperatures between 50° C. and 225° C., means for applying the liquid coolant to the electrical conductor to effect cooling of the electrical conductor mainly by the vaporization of the applied liquid coolant, the vapors of the liquid coolant and the non-condensable gas being intermixed within the casing when the vapors are evolved to provide a dielectric medium for insulating the electrical conductor from the casing, a cooling device, means connecting the lower end of the cooling device with the lower end of the casing and the upper end of the cooling device to the upper end of the casing, said means connecting said cooling device to said casing providing for the flow of the non-condensable gas and vapors in both directions between the casing and cooling device, the means connecting the lower end of the cooling device and the casing being so disposed that the liquid coolant may flow from the cooling device to the casing, and means disposed in the means connecting said cooling device to said casing and responsive to conditions developed as a result of the heating of the electrical conductor for effecting a partial trapping of the non-condensable gas in the cooling device and dielectric vapors in the casing to effectively insulate the electrical conductor, the means connecting from the lower end of the cooling device to the casing providing for the return of condensed vapors to the casing at all times.

2. In electrical apparatus, in combination, a sealed casing having an electrical conductor disposed therein which is subject to temperature changes when in use, a non-condensable gas and a vaporizable liquid coolant contained by the casing, the liquid coolant comprising a fluorinated organic liquid which will vaporize at temperatures between 50° C. and 225° C., means for applying the liquid coolant to the electrical conductor to effect cooling of the electrical conductor mainly by the vaporization of the applied liquid coolant, the vapors of the liquid coolant and the non-condensable gas being intermixed within the casing when the vapors are evolved to provide a dielectric medium for insulating the electrical conductor from the casing, a cooling device, means connecting the lower end of the cooling device with the lower end of the casing and the upper end of the cooling device to the upper end of the casing, said means connecting said cooling device to said casing providing for the flow of a non-condensable gas and vapors in both directions, the means connecting the lower end of the cooling device and the casing being so disposed that the liquid coolant may flow from the cooling device to the casing, and valve means disposed in the means connecting between the cooling device and the casing for partially trapping a substantial amount of the non-condensable gas in the cooling device and cooperating to maintain vapors of the vaporizable coolant in the casing to effectively insulate the conductor, the valve means being responsive to conditions developed in the non-condensable gas and the vaporizable coolant when the conductor is heated when in use, the means connecting the lower end of the cooling device and the casing providing for the flow of the liquid coolant from the cooling device to the casing at all times irrespective of the operation of the valve means.

3. In an electrical apparatus, the combination comprising, a sealed casing having an electrical conductor disposed therein, a non-condensable gas and a vaporizable liquid coolant within the casing, the liquid coolant comprising a fluorinated organic liquid coolant boiling at a temperature between 50° C. and 225° C., means for applying the liquid coolant over the electrical conductor whereby cooling of the electrical conductor is effected mainly by the vaporization of the applied liquid coolant, the vapors of the liquid coolant and the non-condensable gas being intermixed within the casing as the vapors are evolved to provide a dielectric medium for insulating the electrical conductor from the casing, a cooling device connected at its lower end in direct communication with the casing at the lower end thereof for receiving the mixture of vapors and gas therefrom, a conduit disposed to connect the upper end of the cooling device to the casing for returning the non-condensable gas and some of the vapors mixed therewith to the casing, a valve disposed in said conduit, a sylphon bellows disposed in communication with said conduit on the casing side of the valve whereby the bellows is disposed to be operated in response to a predetermined pressure of the intermixed gas and vapors within the casing, and means connecting the bellows to the valve whereby the valve is maintained in a closed position until the pressure within the casing reaches said predetermined value, the valve thereby remaining closed until the occurrence of said predetermined pressure within the casing to entrap the non-condensable gas of the mixture flowing into the cooling device as the vapors of the mixture condense and return to the casing to thereby segregate the non-condensable gas from the casing, the valve being opened upon the occurrence of said predetermined pressure to permit the flow of the non-condensable gas and uncondensed vapor through the cooling device and the conduit to the casing.

4. In an electrical apparatus, the combination comprising, a sealed casing having an electrical conductor disposed therein, a non-condensable gas and a vaporizable liquid coolant within the casing, the liquid coolant comprising a fluorinated organic liquid coolant boiling at a temperature between 50° C. and 225° C., means for applying the liquid coolant over the electrical conductor whereby cooling of the electrical conductor is effected mainly by the vaporization of the applied liquid coolant, the vapors of the liquid coolant and the non-condensable gas being intermixed within the casing as the vapors are evolved to provide a dielectric medium for insulating the electrical conductor from the casing, a cooling device connected at its lower end in direct communication with the casing at the lower end thereof for receiving the mixture of vapors and gas therefrom, a conduit disposed to connect the upper end of the cooling device to the casing for returning the non-condensable gas and some of the vapors mixed therewith to the casing, a valve disposed in said conduit normally biased to a closed position to prevent the flow of gas and vapor through said conduit, an electromagnet disposed to be energized to control the positioning of the valve in response to predetermined changes in the temperature of the dielectric medium within the casing, the valve remaining closed until the temperature of the dielectric medium reaches a predetermined value, and thermally responsive means within the casing disposed for operation in response to the temperature of the dielectric medium to control the energization of the electromagnet, the valve remaining closed, until the electromagnet is energized, to entrap the non-condensable gas of the mixture flowing into the cooling device as the vapors of the mixture condense and return to the casing to thereby segregate the non-condensable gas from the casing, the vapors evolved while the valve remains in the closed position being retained in the casing to develop a given dielectric strength, the valve being opened when actuated by the electromagnet to permit the flow of the non-condensable gas and uncondensed vapor through the cooling device and the conduit to the casing.

5. In an electrical apparatus, the combination comprising, a sealed casing having an electrical conductor disposed therein, a non-condensable gas and a vaporizable liquid coolant within the casing, the liquid coolant comprising a fluorinated organic liquid coolant boiling at a temperature between 50° C. and 225° C., means for applying the liquid coolant over the electrical conductor whereby cooling of the electrical conductor is effected mainly by the vaporization of the applied liquid coolant, the vapors of the liquid coolant and the non-condensable gas being intermixed within the casing as the vapors are evolved to provide a dielectric medium for insulating the electrical conductor from the casing, a cooling device connected at its lower end in direct communication with the casing at the lower end thereof for receiving the mixture of vapors and non-condensable gas therefrom, a conduit disposed to connect the upper end of the cooling device to the casing for returning the non-condensable gas and some of the vapors mixed therewith to the casing, a valve disposed in said conduit normally biased to a closed position to prevent the flow of non-condensable gas and vapor through said conduit, an electromagnet disposed to be energized to control the positioning of the valve in response to predetermined changes in the temperature of the dielectric medium within the casing, the valve remaining closed until the temperature of the dielectric medium reaches a predetermined value, control means disposed to be operated to control the energization of the electromagnet, and a bimetallic element within the casing responsive to the temperature of the dielectric medium to control the operation of the control means, the valve remaining closed until the electromagnet is energized to entrap the non-condensable gas of the mixture flowing into the cooling device as the vapors of the mixture condense and return to the casing to thereby segregate the non-condensable gas from the casing, the vapors evolved while the valve remains in the closed position being retained in the casing to develop a given dielectric strength, the valve being opened when actuated by the electromagnet to permit the flow of the non-condensable gas and uncondensed vapor through the cooling device and the conduit to the casing.

6. In an electrical apparatus, the combination comprising, a sealed casing having an electrical conductor disposed therein, a non-condensable gas and a vaporizable liquid coolant within the casing, the liquid coolant comprising a fluorinated organic liquid coolant boiling at a temperature between 50° C. and 225° C., means for applying the liquid coolant over the electrical conductor whereby cooling of the electrical conductor is effected mainly by the vaporization of the applied liquid coolant, the vapors of the liquid coolant and the non-condensable gas being intermixed within the casing as the vapors are evolved to provide a dielectric medium for insulating the electrical conductor from the casing, a cooling device having an upper and a lower end, a lower conduit connected to the lower end of the cooling device and in communication with the casing at the lower end thereof for receiving the mixture of vapors and non-condensable gas therefrom, an upper conduit disposed to connect the upper end of the cooling device to the casing for returning the non-condensable gas and some of the vapors mixed therewith to the casing, a valve disposed in said lower conduit normally biased to a closed position to prevent the flow of non-condensable gas and vapor through said lower conduit, means disposed for operation to actuate the valve towards the fully open position in response to predetermined changes in a condition of the dielectric medium within the casing, said valve remaining closed until the condition of the dielectric medium reaches a predetermined value, the vapors evolved while said valve remains in the closed position being retained in the casing to develop a given dielectric strength, said last means being operative upon the occurrence of said predetermined value to actuate the valve to permit the flow of the non-condensable gas and uncondensed vapor through said lower conduit, said cooling device, and said upper conduit to the casing, to maintain a given condition of the dielectric medium within the casing, and a liquid trap so connected to said lower conduit as to permit the flow of the condensed vapors from the cooling device to the casing and yet prevent the flow of non-condensable gas and uncondensed vapor through said lower conduit when the valve is in the closed position.

7. In an electrical apparatus, the combination comprising, a sealed casing having an electrical conductor disposed therein, a non-condensable gas and a vaporizable liquid coolant within the casing, the liquid coolant comprising a fluorinated organic liquid coolant boiling at a temperature between 50° C. and 225° C., means for applying the liquid coolant over the electrical conductor whereby cooling of the electrical conductor is effected mainly by the vaporization of the applied liquid coolant, the vapors of the liquid coolant and the non-condensable gas being intermixed within the casing as the vapors are evolved to provide a dielectric medium for insulating the electrical conductor from the casing, a cooling device having an upper and a lower end, a lower conduit connected to the lower end of the cooling device and in communication with the casing at the lower end thereof for receiving the mixture of vapors and non-condensable gas therefrom, an upper conduit disposed to connect the upper end of the cooling device to the casing for returning the non-condensable gas and some of the vapors mixed therewith to the casing, the upper conduit including an inverted portion, a valve disposed in said lower conduit normally biased to a closed position to prevent the flow of non-condensable gas and vapor through said lower conduit, means disposed for operation to actuate the valve towards the fully open position in response to predetermined changes in a condition of the dielectric medium within the casing, said valve remaining closed until the condition of the dielectric medium within the casing reaches a predetermined value, the vapors evolved while said valve remains in the closed position being retained in the casing to develop a given dielectric strength, said last means being operative upon the occurrence of said predetermined value to actuate the valve to permit the flow of the non-condensable gas and uncondensed vapor through said lower conduit, said cooling device, and said upper conduit to the casing, to maintain a given condition of the dielectric medium within the casing, and a liquid trap so connected to said lower conduit as to permit the flow of the condensed vapors from the cooling device to the casing and yet prevent the flow of non-condensable gas and uncondensed vapor through said lower conduit when the valve is in the closed position.

References Cited in the file of this patent

UNITED STATES PATENTS

| | | |
|---|---|---|
| 2,083,611 | Marshall | June 15, 1937 |
| 2,561,738 | Hill | July 24, 1951 |